United States Patent
Liken et al.

(10) Patent No.: US 9,889,790 B2
(45) Date of Patent: Feb. 13, 2018

(54) IMAGING SYSTEM WITH ADAPTIVE HIGH BEAM CONTROL

(71) Applicant: Gentex Corporation, Zeeland, MI (US)

(72) Inventors: Peter A. Liken, West Olive, MI (US); Marc A. Smeyers, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/631,117

(22) Filed: Jun. 23, 2017

(65) Prior Publication Data

US 2017/0368981 A1    Dec. 28, 2017

Related U.S. Application Data

(60) Provisional application No. 62/354,318, filed on Jun. 24, 2016.

(51) Int. Cl.
| | |
|---|---|
| *B60Q 1/14* | (2006.01) |
| *G06K 9/00* | (2006.01) |
| *G06K 9/62* | (2006.01) |
| *G06K 9/46* | (2006.01) |

(52) U.S. Cl.
CPC ....... *B60Q 1/1423* (2013.01); *G06K 9/00825* (2013.01); *G06K 9/4661* (2013.01); *G06K 9/6284* (2013.01); *B60Q 2300/056* (2013.01); *B60Q 2300/41* (2013.01); *B60Q 2300/42* (2013.01)

(58) Field of Classification Search
CPC .... B60Q 1/1423; B60Q 1/143; B60Q 1/1446; B60Q 2300/41; B60Q 2300/42; B60Q 2300/056; B60Q 2300/052; G06K 9/00825; G06K 9/4661; G06K 9/628
See application file for complete search history.

(56) References Cited

U.S. PATENT DOCUMENTS

| | | | | |
|---|---|---|---|---|
| 5,837,994 | A * | 11/1998 | Stam | B60Q 1/085 250/208.1 |
| 8,045,760 | B2 * | 10/2011 | Stam | B60Q 1/1423 340/457.2 |
| 2007/0147055 | A1* | 6/2007 | Komatsu | B60Q 1/085 362/464 |
| 2008/0129206 | A1* | 6/2008 | Stam | B60Q 1/085 315/82 |
| 2009/0190323 | A1* | 7/2009 | Watanabe | B60Q 1/143 362/37 |
| 2013/0320193 | A1* | 12/2013 | Liken | H01L 27/146 250/208.1 |

* cited by examiner

*Primary Examiner* — Thai Pham
(74) *Attorney, Agent, or Firm* — Price Heneveld LLP; Bradley D. Johnson

(57) ABSTRACT

An imaging system is provided herein. An image sensor is configured to acquire one or more images of a scene external and forward of a controlled vehicle and to generate image data corresponding to the acquired images. A controller is communicatively connected to the image sensor and is configured to receive and analyze the image data. The controller detects an object of interest in the image data and generates an ON signal or an OFF signal based on the detection of the object of interest in the image data, or lack thereof. A high beam control of the vehicle is turned ON based on the ON signal or turned OFF based on the OFF signal. The controller modifies a future response time at which the OFF signal is generated based on an external overriding of the ON signal or the OFF signal.

20 Claims, 4 Drawing Sheets

IMAGING SYSTEM WITH ADAPTIVE HIGH BEAM CONTROL

CROSS-REFERENCE TO RELATED APPLICATION

This patent application claims benefit to U.S. Provisional Patent Application No. 62/354,318, which was filed on Jun. 24, 2016, entitled "IMAGING SYSTEM WITH ADAPTIVE HIGH BEAM CONTROL." The aforementioned related application is hereby incorporated by reference in its entirety.

BACKGROUND OF THE INVENTION

The present invention generally relates to imaging systems of a controlled vehicle, and more particularly, to imaging systems for controlling the exterior lights of the controlled vehicle.

SUMMARY OF THE INVENTION

According to one aspect of the present invention, an imaging system is provided. An image sensor is configured to acquire one or more images of a scene external and forward of a controlled vehicle and to generate image data corresponding to the acquired images. A controller is communicatively connected to the image sensor and is configured to receive and analyze the image data. The controller detects an object of interest in the image data, wherein the object of interest is at least one of an oncoming vehicle and a preceding vehicle. The controller generates an ON signal or an OFF signal based on the detection of the object of interest in the image data, or lack thereof. A high beam control of the vehicle is turned ON based on the ON signal or is turned OFF based on the OFF signal. The controller modifies a future response time at which the OFF signal is generated based on an external overriding of the ON signal or the OFF signal.

According to another aspect of the present invention, a method of controlling exterior lights of a vehicle is provided and includes the steps of: acquiring one or more images of a scene external and forward of a controlled vehicle and to generating image data corresponding to the acquired images; analyzing the image data; detecting an object of interest in the image data, wherein the object of interest is at least one of an oncoming vehicle and a preceding vehicle; generating an ON signal or an OFF signal based on the detection of the object of interest in the image data, or lack thereof, wherein a high beam control of the vehicle is turned ON based on the ON signal, and wherein the high beam control of the vehicle is turned OFF based on the OFF signal; and modifying a future response time at which the OFF signal is generated based on an external overriding of the ON signal or the OFF signal.

According to yet another aspect of the present invention, a non-transitory computer readable medium is provided. The non-transitory computer medium includes software instructions stored thereon and executed by a processor. The software instructions include the steps of: acquiring one or more images of a scene external and forward of a controlled vehicle and to generating image data corresponding to the acquired images; analyzing the image data; detecting an object of interest in the image data, wherein the object of interest is at least one of an oncoming vehicle and a preceding vehicle; generating an ON signal or an OFF signal based on the detection of the object of interest in the image data, or lack thereof, wherein a high beam control of the vehicle is turned ON based on the ON signal, and wherein the high beam control of the vehicle is turned OFF based on the OFF signal; and modifying a future response time at which the OFF signal is generated based on an external overriding of the ON signal or the OFF signal.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
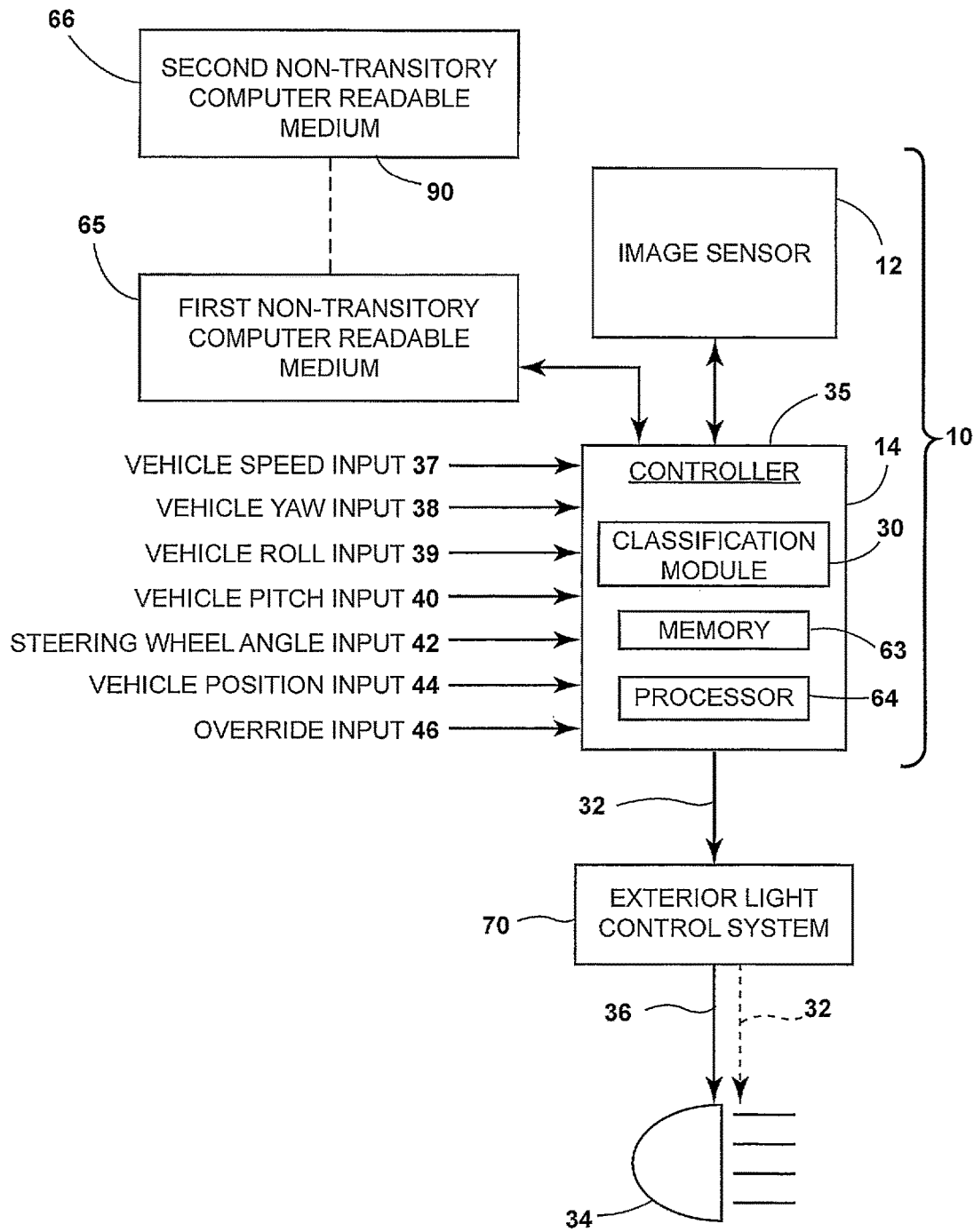
FIG. 1 is a block diagram illustrating one embodiment of an imaging system of a controlled vehicle and includes an image sensor in communication with a controller.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system capable of controlling or otherwise communicating with an exterior light control system of a controlled vehicle in response to image data acquired from an image sensor, which captures images external and forward of the vehicle. Adaptive Main Beam Control (ADB) and alternate methods of controlling the light beam illumination in front of a motor vehicle maximizes the use of high beams at night by identifying oncoming and preceding vehicles and automatically controlling the high beam lighting pattern. This prevents glare to other vehicles, yet maintains a high beam light distribution to illuminate areas not occupied by other vehicles. Some imaging systems are known for controlling exterior vehicle lights in response to images captured forward of the vehicle. In these systems, a controller would analyze the captured images and determine if any oncoming or preceding vehicles were present in a glare area in front of the controlled vehicle employing the system. This "glare area" was the area in which the exterior lights of the controlled vehicle would cause excessive glare to a driver of another an oncoming or preceding vehicle if the exterior lights were in a high beam state (or some state other than a low beam state). If a vehicle was present in the glare area, the controller may respond by turning OFF the high beams or recommending the same so as to not cause glare to the other driver(s). Examples of such systems are described in U.S. Pat. Nos. 5,837,994, 5,990,469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

U.S. Pat. No. 8,543,254, entitled "VEHICULAR IMAGING SYSTEM AND METHOD FOR DETERMINING ROADWAY WIDTH," discloses an imaging system that improves upon the prior systems by determining a road model based on the roadway width and roadway type (i.e., a motorway, two-lane road, multi-lane road, etc.) in order to more accurately discriminate between other vehicles and non-vehicle light sources and to allow different modes of operation depending upon the type of roadway on which the controlled vehicle is traveling. More specifically, the roadway width may be estimated from various objects detected in the forward scene, including lane markers, reflectors, road signs, and any other objects that may be useful to detect the edges of the road. The roadway type may be determined from the roadway width. Other vehicle parameters such as vehicle speed, yaw, roll, position and vehicle direction may also be used when determining the roadway type and the road model. Then, using the road model, the system may track the positioning (or "world positioning") of the controlled vehicle relative to the movement, brightness, size, color, and other characteristics of various detected light sources to determine if the light sources appear to be on the roadway. If so, the light sources are more likely to be another vehicle to which the system responds by appropriately controlling the exterior lights.

In these prior systems, the response time at which the high beams are turned OFF is typically set to a default setting (e.g., by an original equipment manufacturer (OEM)) and fails to account for varying driving environments along with the preferences of a driver of the controlled vehicle. Accordingly, drivers desiring faster or slower response times are forced to manually override the automatic control of the high beams in order to turn OFF the high beams or keep the high beams turned ON for a longer period of time. In one exemplary scenario, a driver operating the controlled vehicle along a curved road in a hill or mountain area may desire the high beams to be turned OFF sooner for fear of causing excessive glare to a driver of another vehicle that suddenly appears in front of the controlled vehicle. In another exemplary scenario, a driver operating the controlled vehicle along a substantially straight road in a relatively flat environment may desire for the high beams to remain turned ON for a longer period of time. In yet another exemplary scenario, a driver operating the controlled vehicle may simply desire faster or slower response times based on an operating environment of the controlled vehicle when oncoming or preceding vehicles are absent. In such scenarios, the driver of the controlled vehicle is forced to override automatic control of the high beams, which may be performed externally through conventional means such as, but not limited to, manipulation of an indicator stalk next to the steering wheel of the controlled vehicle.

Accordingly, an improved imaging system is described herein and is capable of modifying the response time in which the high beams are turned OFF to better suit the preferences of a driver as well as take into account the current operating environment of a controlled vehicle. With respect to the embodiments described herein, it is assumed that the controlled vehicle is operating in a dark environment such that the use of high beams would assist a driver in navigating the controlled vehicle. It is contemplated that the automatic control of the high beams may be based on information from an ambient light sensor or other means by which the imaging system can determine the lighting conditions of an operating environment.

Figure 2:
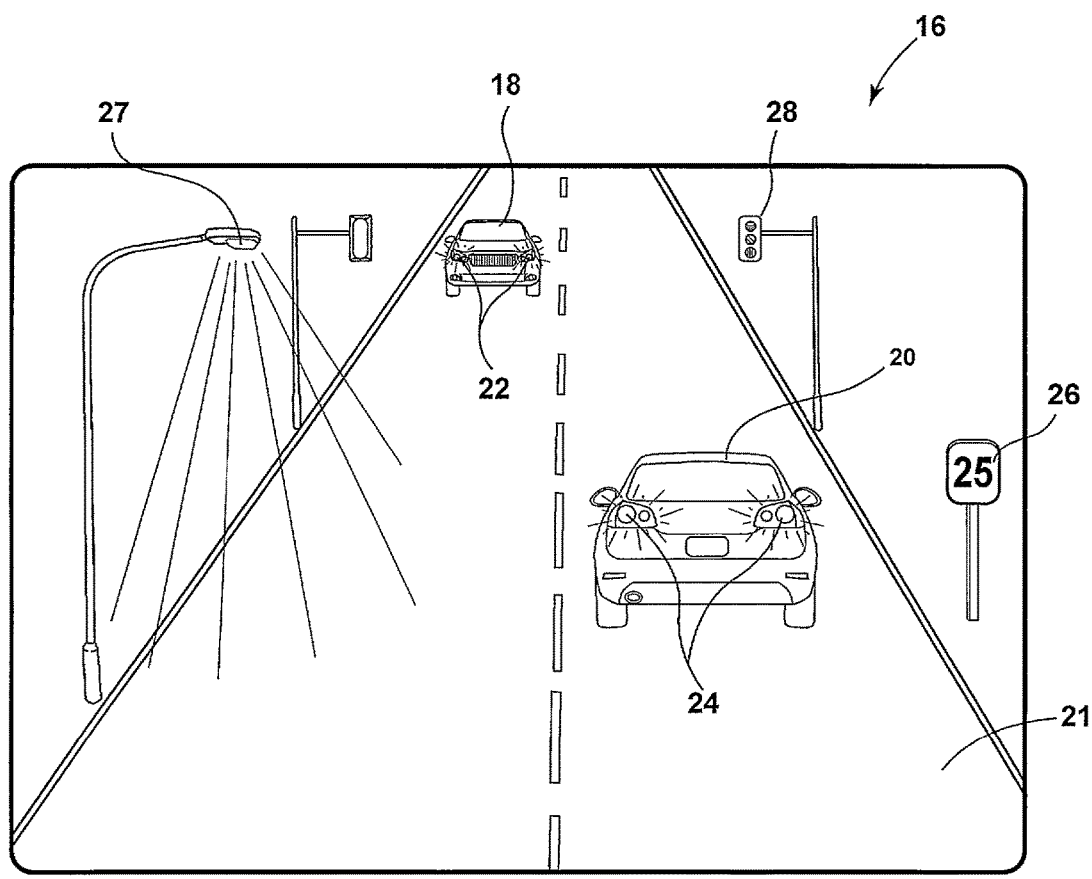
FIG. 2 represents an image acquired by the image sensor of the imaging system.

With reference to FIG. 1, an imaging system 10 is shown according to one embodiment and includes an image sensor 12 and a controller 14 communicatively connected to the image sensor 12. The image sensor 12 is configured to acquire one or more images of a scene external and forward of a controlled vehicle and to generate image data corresponding to the acquired images. The controller 14 receives and analyzes the image data to detect an object(s) of interest, or lack thereof. According to one embodiment, the object of interest(s) includes at least one of an oncoming vehicle and a preceding vehicle, either of which may be configured as a 4-wheeled vehicle, a two-wheeled vehicle (e.g., a motorcycle), or a vehicle having a different wheel number. For the purposes of illustration, FIG. 2 generally represents an image 16 acquired by the image sensor 12 and includes an oncoming vehicle 18 and a preceding vehicle 20 each located forward of the controlled vehicle and travelling on a road 21, generally depicted as a straight road for exemplary purposes. To detect the oncoming and preceding vehicles 18, 20, the controller 14 may analyze image data for the presence of light features indicative of headlamps 22 and taillights 24. Such light features may include brightness, color, size, movement, location, as well as any other light characteristics known in the art.

Accordingly, by analyzing light features present in the image data to determine the presence of headlamps 22 and taillights 24, the controller 14 may differentiate between the oncoming vehicle 18 and the preceding vehicle 20 and may further differentiate the oncoming and preceding vehicles 18, 20 from non-vehicle light sources appearing in the image data such as, but not limited to, a street sign 26, a street lamp 27, and a traffic light 28. In one embodiment, the controller 14 may include a classification module 30 that classifies a light source appearing in the image data as an object of interest (i.e., either an oncoming vehicle or a preceding vehicle) or an object of noninterest (e.g., a sign, a street lamp, a traffic light, etc.).

With continued reference to FIG. 1, the controller 14 generates a signal 32 for a high beam 34 of the controlled vehicle to be turned ON or OFF based on the detection of an object(s) of interest in the image data or lack thereof. For example, the signal 32 generated by the controller 14 may correspond to an "ON signal" to turn ON the high beam 34 when an object(s) of interest is not detected or the object(s) of interest is detected but is not located in the glare area. In instances where the object(s) of interest is detected to be in the glare area or about to enter the glare area, the signal 32 generated by the controller 14 may correspond to an "OFF signal" to turn OFF the high beam 34. In one embodiment, the signal 32 is indicative of a recommendation for the high beam 34 to be turned ON or OFF and is provided to an exterior light control system 35 of the controlled vehicle, which may heed the recommendation by outputting a signal 36 to control the high beam 34 accordingly. Alternatively, the exterior light control system 35 may override the signal 32 based on information from vehicle input and/or other considerations. The signal 32 may include not only a recommendation, but also a code representing a reason for the recommendation so that the exterior light control system 35 may determine whether or not an override is necessary. Alternatively, the signal 32 may bypass the exterior light control system 35 such that the signal 32 directly controls the high beam 34. While the controller 14 is shown in FIG. 1 as being separate from the exterior light control system 35, it should be appreciated that the controller 14 may be integrated with the exterior light control system 35 or other vehicle equipment in other embodiments.

It should be appreciated that the controller 14 may generate other signals used for ultimately controlling other exterior lights of the controlled vehicle. As used herein, "exterior lights" broadly includes any exterior lighting on the controlled vehicle. Such exterior lights may include headlamps (both low and high beam if separate from another), taillights, foul weather lights such as fog lights, brake lights, center-mounted stop lights (CHMSLs), turn signals, back-up lights, etc. Accordingly, it will be apparent to those skilled in the art that the exterior lights may be operated in several different modes including conventional low beam and high beam states. The exterior lights may also be operated as daytime running lights, and additionally as super-bright high beams in those countries where they are permitted.

The brightness of the exterior lights may be continuously varied between the low, high, and super-bright states. Separate lights may be provided for obtaining each of these states or the actual brightness of the exterior lights may be varied to accomplish the same. In both instances, the "perceived brightness" or illumination patterns of the exterior lights may be varied. As used herein, the term "perceived brightness" generally refers to the brightness of the exterior lights as perceived by an observer outside the controlled vehicle. Most typically, such observers will be drivers or passengers in an oncoming or preceding vehicle. Generally, the high beam 34 is controlled such that if an observer is located in a vehicle within a glare area relative to the controlled vehicle (i.e., the area in which the observer would perceive the brightness of the high beam 34 as causing excessive glare), the beam illumination pattern is varied such that the observer is no longer in the glare area. The perceived brightness and/or glare area of the high beam 34 may be varied by changing an illumination output of the high beam 34, steering the direction in which the high beam 34 is aimed, selectively blocking or otherwise deactivating the high beam 34, or a combination of the above.

As further shown in FIG. 1, a number of vehicle inputs may be provided to the controller 14 and may be taken into account in generating the signal 32. For example, the controller 14 may receive a vehicle speed input 37, a vehicle yaw input 38, a vehicle roll input 39, a vehicle pitch input 40, a steering wheel angle input 42, a vehicle position input 44 (e.g., from a GPS device), and an override input 46. These and other inputs may be provided to the controller 14 from a variety of conventional vehicle equipment over a CAN bus, a LIN bus, or any other suitable communication link. Additionally or alternatively, some or all of the inputs may be provided to the exterior light control system 35 and be subsequently communicated to the controller 14. In operation, the controller 14 may take advantage of the availability of these inputs in making decisions related to the generation of signal 32. For example, inputs 37-42 provide vehicle speed, yaw, pitch, roll, and steering wheel angle information to the controller 14 to enable the controller 14 to decide whether or not to generate the signal 32 based on a relative positioning between the controlled vehicle and a detected object(s) of interest. The positional input 44 provides a geographical coordinate to the controller 14 and enables the controller 14 to determine whether or not to generate the signal 32 based on a type of road and/or a geographical region (e.g., a mountain, forest, countryside, etc.) in which the controlled vehicle is travelling. Override input 46 provides the controller 14 with information related to an overriding of the signal 32. For example, this may occur when a driver of the controlled vehicle manually intervenes to turn ON the high beam 34 in instances where the signal 32 recommends that the high beam 34 be turned OFF, or vice versa.

Figure 3:
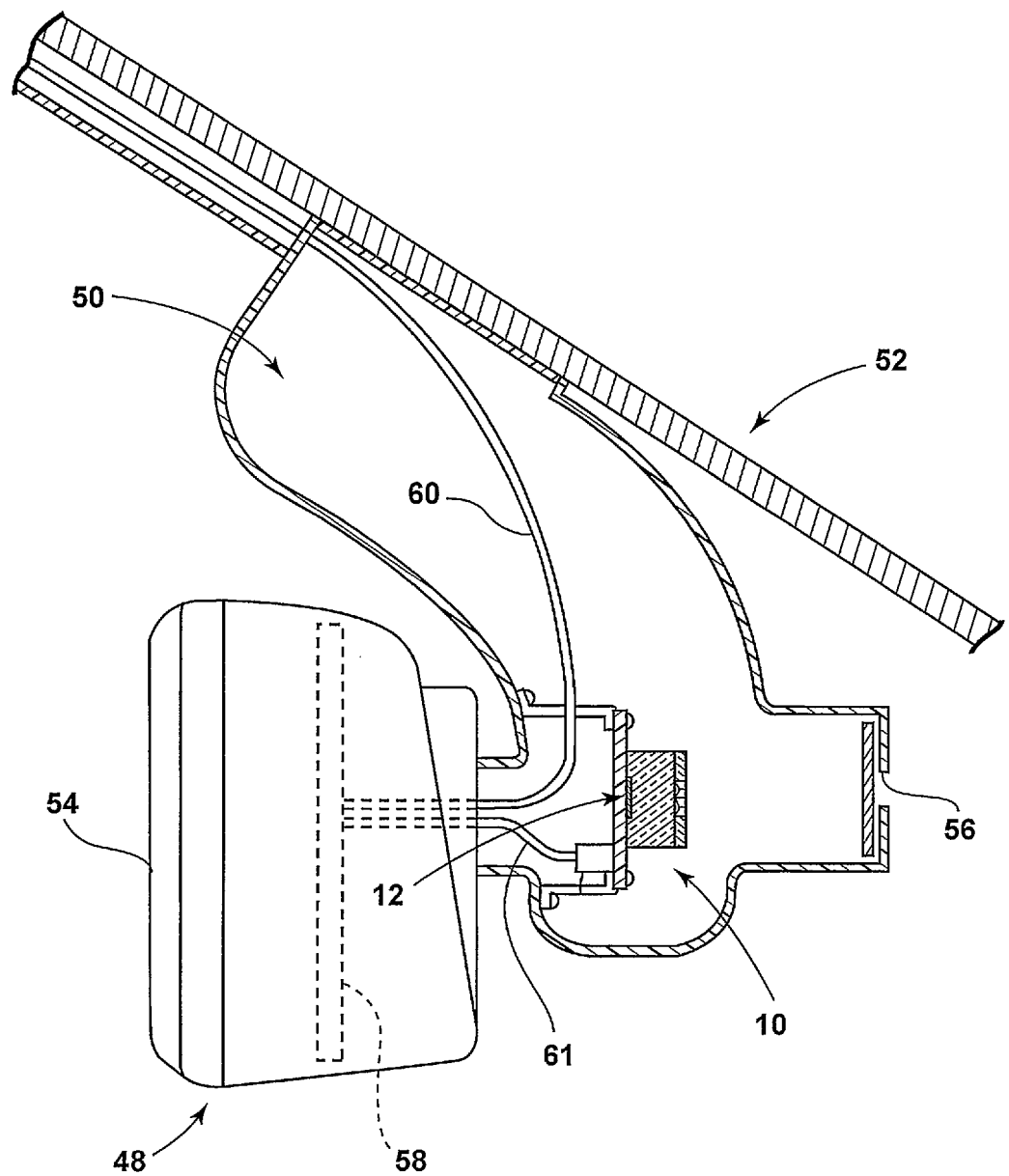
FIG. 3 illustrates one embodiment of a rearview mirror assembly incorporating certain components of the imaging system.

Referring to FIG. 3, portions of imaging system 10 can be advantageously integrated into a rearview mirror assembly 48. For example, the image sensor 12 may be integrated into a mount 50 of the rearview mirror assembly 48 to provide an unobstructed forward view through a windshield region 52 of the controlled vehicle that is typically cleaned by the controlled vehicle's windshield wipers. Additionally, the mounting of the image sensor 12 in the rearview mirror assembly 48 permits sharing of circuitry such as a power supply, microcontroller, and light sensors. Rearview mirror assembly 48 may include a mirror element 54 that is a prismatic element or an electro-optic element, such as an electrochromic element. The mount 50 may be generally opaque except for an aperture 56 through which light from a forward external scene is received by the image sensor 12.

It is contemplated that the image sensor 12 may be any conventional image sensor. Examples of suitable imaging sensors are disclosed in U.S. Pat. Nos. 8,289,430 and 8,924,078, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

In operation, the image sensor 12 may be controlled by the controller 14 to acquire one or more images of a scene external and forward of the controlled vehicle. The controller 14 may be provided on a circuit board 58 provided inside the mount 50 by conventional means. Communication between the controller 14 and vehicle equipment (e.g., exterior light control system 35) may occur via communication bus 60 and it is contemplated that the controller 14 and image sensor 12 may be powered using the same. Communication between the controller 14 and the image sensor 12 may occur over a communication bus 61, which may be a bi-directional serial bus, a parallel bus, a combination of both, or other suitable means.

Additional details on the manner by which the image sensor may be integrated into a rearview mirror assembly and configured to acquire images are provided in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

Figure 4:
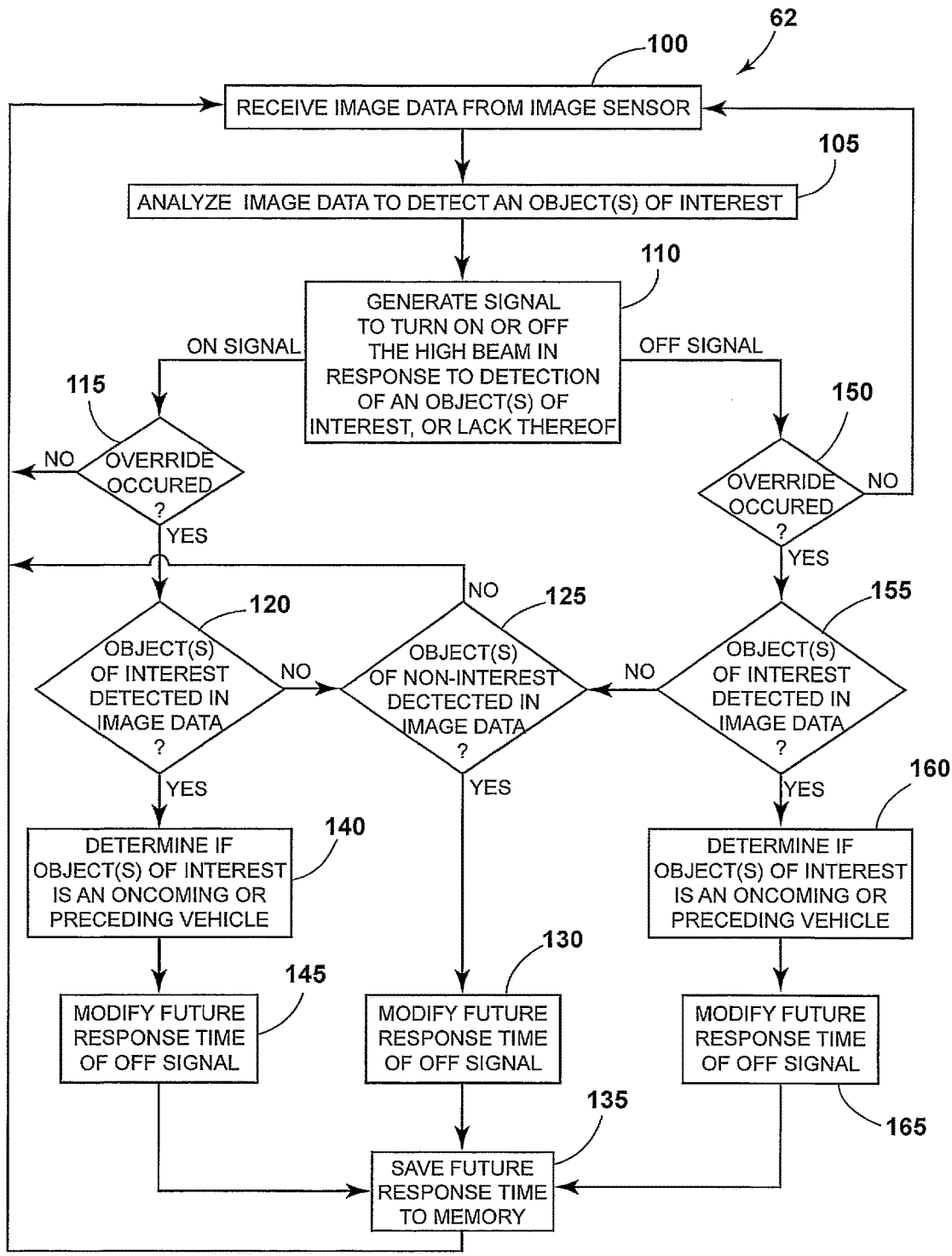
FIG. 4 is a flow diagram of a method for controlling the exterior lights of the controlled vehicle.

Referring to FIG. 4, a method 62 of controlling the high beam 34 of the controlled vehicle is shown according to one embodiment. The method 62 is described herein as being implemented by the controller 14 and may be stored to a memory 63 (FIG. 1) as a subroutine executed by a processor 64 (FIG. 1). The method 62 may be embodied as a non-transitory computer readable medium having stored thereon software instructions that, when executed by the processor 64, cause the processor 64 to execute the steps of the method 62. In other words, aspects of the method 62 may be achieved by software stored on a non-transitory computer readable medium or software modifications or updates to existing software residing in a non-transitory computer readable medium. Such software or software updates may be downloaded into a first non-transitory computer readable medium 65 (FIG. 1) of the controller 14, typically prior to being installed in the controlled vehicle, from a second non-transitory computer readable medium 66 (FIG. 1) remotely located from the first non-transitory computer readable medium 65. The second non-transitory computer readable medium 66 may be in communication with the first non-transitory computer readable medium 65 by any suitable means, which may at least partially include the Internet or a local or wide area wired or wireless network.

As shown in FIG. 4, the method 62 may begin at step 100, where the controller 14 receives image data from the image sensor 12. At step 105, the controller 14 analyzes the image data to detect an object(s) of interest. Assuming dark conditions are present, the controller generates the signal 32 to either turn ON or OFF the high beam 34 of the controlled vehicle in response to detection of an object(s) of interest or lack thereof, at step 110. As described herein, the signal 32 may correspond to either an ON signal or an OFF signal and may serve only as a recommendation to turn the high beam 34 ON or OFF or otherwise directly control the high beam 34 to do the same. If the signal 32 corresponds to an ON signal indicating for the high beam 34 to be turned ON, the controller 14 proceeds to steps 115 and 120 to check whether an override (e.g., an external override using an indicator stalk) of the signal 32 has occurred via override input 46 and whether an object(s) of interest is detected in the image data.

If no override has occurred, the controller 14 returns to step 100. If an override has occurred but no object(s) of interest is detected in the image data, the controller 14 proceeds to step 125 to detect an object(s) of noninterest in the image data. As described herein, an object of noninterest may include a variety of non-vehicle light sources such as a sign, street lamp, stop light, etc. If no object(s) of noninterest is detected in the image data, the controller 14 returns to step 100. Otherwise, if an object(s) of noninterest is detected in the image data, the controller 14 proceeds to step 130 to modify a future response time at which the OFF signal is generated in instances where the signal 32 corresponds to an ON signal and only the object(s) of noninterest is detected in the image data. In the present scenario, the overriding of the ON signal typically indicates that a driver of the controlled vehicle desires for the high beam 34 to be turned OFF sooner. This may occur when a controlled vehicle transitions from a dark area into an area having many non-vehicle light sources such as a city street and the like, whereby lighting from the non-vehicle light sources provides sufficient illumination to a driver of the controlled vehicle. Accordingly, the controller 14 may shorten the future response time of the OFF signal in instances where the signal 32 corresponds to an ON signal and a large number of objects of noninterest are detected in the image data. For example, the controller 14 may shorten the future response time of the OFF when the number of objects of noninterest detected at step 125 meet or exceed a threshold value. Additionally or alternatively, the controller 14 may shorten the future response time of the OFF signal based on vehicle input from inputs 37-44, thereby taking into account a speed of the controlled vehicle, a vehicle position (e.g., distance and/or orientation) of the controlled vehicle relative to the detected object(s) of noninterest, and/or a geographical location of the controlled vehicle.

According to one embodiment, a weighted value may be assigned to light features associated with the detected object(s) of noninterest in order to hasten its classification by the classification module 30. As a result, the future response time at which the OFF signal is generated is decreased such that the high beam 34 is turned OFF sooner. The amount by which the future response time is decreased may be variously determined by the OEM. In embodiments where the high beam 34 is continuously variable between an ON and OFF state, the future response time of the OFF signal, as modified in step 130, may result in a shortened start time at which to begin dimming of the high beam 34 and/or a shortened length of time to dim off the high beam 34. Once the future response time of the OFF signal has been modified, the controller 14 saves it to memory 63 (FIG. 1) at step 135 and returns to step 100. In some embodiments, the future response time of the OFF signal, as modified at step 130, may overwrite a default response time or a previously saved future response time of the OFF signal such that the high beam 34 is turned OFF pursuant to the most recently saved future response time in a subsequent iteration of step 110 under the conditions described above. Thus, it is to be understood that the future response time of the OFF signal, as modified and saved in steps 130 and 135, can be later implemented in specific instances where the signal 32 corresponds to an ON signal (e.g., resulting in the high beam 34 being in an ON state) and is based on a large number of objects of noninterest being detected in the image data, a speed of the controlled vehicle, a relative positioning between the controlled vehicle and the detected object(s) of noninterest, a geographical location of the controlled vehicle, or any combination thereof.

Returning to step 115 and 120, if an override has occurred and an object(s) of interest is detected in the image data, the controller 14 proceeds to step 140 to determine if the object(s) of interest is an oncoming or preceding vehicle. As described herein, the controller 14 may differentiate between an oncoming or preceding vehicle by analyzing light features to determine the presence of a headlamp or a taillight in the image data. Analysis of light features may also reduce or eliminate the likelihood of falsely identifying an object of noninterest as an object of interest. Once the controller 14 identifies the object(s) of interest as either an oncoming or preceding vehicle, the controller 14 proceeds to step 145 to modify a future response time at which the OFF signal is generated in instances where the high beam 34 is turned ON and the object(s) of interest is detected in the imaged data. Generally, the overriding of the ON signal when an object(s) of interest is detected in the image data typically means that a driver of the controlled vehicle desires for the high beam 34 to be turned OFF sooner, such as in the scenario where the controlled vehicle is operating in an environment where other vehicles may suddenly appear in front of the controlled vehicle (e.g., along a curved road in a hill or mountain area). Accordingly, the controller 14 may shorten the future response time of the OFF signal whenever the signal 32 corresponds to an ON signal and the object(s) of interest is detected in the image data at close range, such as within a predetermined distance from the controlled vehicle. Additionally or alternatively, the controller 14 may shorten the future response time of the OFF signal based on a speed of the controlled vehicle and/or an orientation of the controlled vehicle relative to the detected object(s) of interest. In some embodiments, the distance and relative orientation between the controlled vehicle and the detected object(s) of interest may be determined based on information provided from inputs 37-42. Additionally or alternatively still, the controller 14 may shorten the future response time of the OFF signal based on the number of object of interest detected in the image data and/or information provided from input 44, thereby taking into account a geographical location of the controlled vehicle.

According to one embodiment, a weighted value may be assigned to light features associated with either a headlamp or taillight in order to hasten their classification by the classification module 30. As a result, the future response time at which the OFF signal is generated is decreased such that the high beam 34 is turned OFF sooner and may be variously determined by the OEM. In embodiments where the high beam 34 is continuously variable between an ON and OFF state, the future response time of the OFF signal, as modified in step 145, may result in a shortened start time at which to begin dimming of the high beam 34 and/or a shortened length of time to dim off the high beam 34. By performing step 140 before step 145, the future response time may be variable based on the number and classification of the object(s) of interest, namely whether the object(s) of interest is an oncoming or preceding vehicle. However, it is contemplated that the response time may be the same regardless of whether the object(s) of interest is an oncoming or preceding vehicle, if desired. Once the future response time of the OFF signal has been modified, the controller 14 saves it to memory 63 (FIG. 1) at step 135 and returns to step 100. In some embodiments, the future response time of the OFF signal, as modified at step 145, may overwrite a default response time or a previously saved future response time of the OFF signal such that the high beam 34 is turned OFF pursuant to the most recently saved future response time in a subsequent iteration of the step 110 under the conditions described above. Thus, it is to be understood that the future response time of the OFF signal, as modified and saved in steps 145 and 135, can be later implemented in specific instances where the signal 32 corresponds to an ON signal (e.g., resulting in the high beam 34 being in an ON state) and may be based on the number of objects of interest detected in the image data, a speed of the controlled vehicle, a relative distance and/or orientation between the controlled vehicle and the detected object(s) of interest, a geographical location of the controlled vehicle, or any combination thereof.

Returning back to step 110, if the signal 32 corresponds to an OFF signal indicating for the high beam 34 to be turned OFF, the controller 14 proceeds to steps 150 and 155 to check whether an override of the signal 32 has occurred via override input 46 and whether an object(s) of interest is detected in the image data. If no override has occurred, the controller 14 returns to step 100. If an override has occurred but no object(s) of interest is detected in the image data, the controller 14 proceeds to step 125 to detect an object(s) of noninterest in the image data. If no object(s) of noninterest is detected in the image data, the controller 14 returns to step 100. Otherwise, if an object(s) of noninterest is detected in the image data, the controller 14 proceeds to step 130 to modify a future response time at which the OFF signal is generated in instances where the signal 32 corresponds to an ON signal and only the object(s) of noninterest is detected in the image data. In the present scenario, the overriding of the OFF signal typically indicates that a driver of the controlled vehicle desires for the high beam 34 to remain ON longer when only the object(s) of noninterest is present in the image data. This may occur in dark areas having few non-vehicle light sources such as a country road and the like. Accordingly, the controller 14 may increase the future response time of the OFF signal in instances where the signal 32 corresponds to an ON signal and the objects of noninterest detected in the image data are few in number. For example, the controller 14 may increase the future response time of the OFF signal when the number of objects of noninterest detected at step 125 fail to meet or is below a threshold value. Additionally or alternatively, the controller 14 may increase the future response time of the OFF signal based on vehicle input from inputs 37-44, thereby taking into account a speed of the controlled vehicle, a position (e.g., distance and/or orientation) of the controlled vehicle relative to the detected object(s) of noninterest as well as a geographical location of the controlled vehicle.

According to one embodiment, a weighted value may be assigned to light features associated with the detected object(s) of noninterest in order to prolong its classification by the classification module 30. As a result, the future response time at which the OFF signal is generated is increased such that the high beam 34 remains ON longer and may be variously determined by the OEM. In embodiments where the high beam 34 is continuously variable between an ON and OFF state, the future response time of the OFF signal, as modified in step 130, may result in a prolonged start time at which to begin dimming of the high beam 34 and/or a prolonged length of time to dim off the high beam 34. Once the future response time of the OFF signal has been modified, the controller 14 saves it to memory 63 (FIG. 1) at step 135 and returns to step 100. In some embodiments, the future response time of the OFF signal, as modified at step 130, may overwrite a default response time or a previously saved future response time of the OFF signal such that the high beam 34 is turned OFF pursuant to the most recently saved future response time in a subsequent iteration of step 110 under the conditions described above. Thus, it is to be understood that the future response time of the OFF signal, as modified and saved in steps 130 and 135, can be later implemented in specific instances where the signal 32 corresponds to an ON signal (e.g., resulting in the high beam 34 being in an ON state) and may be based on a small number of objects of noninterest being detected in the image data, a speed of the controlled vehicle, a relative positioning between the controlled vehicle and the detected object(s) of noninterest, a geographical location of the controlled vehicle, or any combination thereof.

Returning back to steps 150 and 155, if an override has occurred and an object of interest is detected in the image data, the controller 14 proceeds to step 160 to determine if the object of interest is an oncoming or preceding vehicle. Once the controller 14 identifies the object of interest as either an oncoming or preceding vehicle, the controller 14 proceeds to step 165 to modify a future response time at which the OFF signal is generated in instances where the high beam 34 is turned ON and the object(s) of interest is detected in the imaged data. Generally, the overriding of the ON signal when the object(s) of interest is detected in the image data means that a driver of the controlled vehicle desires for the high beam 34 to remain ON longer, such as in the scenario where the controlled vehicle is operating along a substantially straight road in a relatively flat environment and oncoming or preceding vehicles are detected at greater distances relative to the controlled vehicle. Accordingly, the controller 14 may increase the future response time of the OFF signal whenever the signal 32 corresponds to an ON signal and the object(s) of interest is detected in the image data at long range, such as beyond a predetermined distance from the controlled vehicle. Additionally or alternatively, the controller 14 may modify the future response time of the OFF signal based on an orientation of the controlled vehicle relative to the detected object(s) of interest. Generally, if the detected object(s) of interest is approaching the controlled vehicle head on, it is more indicative that the controlled vehicle is operating on a substantially straight road. In some embodiments, the distance and relative orientation between the controlled vehicle and the detected object(s) of interest may be determined based on information provided from inputs 37-42. Additionally or alternatively still, the controller 14 may modify the future response time of the OFF signal based on the number of object(s) of interest detected in the image data and/or information provided from input 44, thereby taking into account a geographical location of the controlled vehicle.

According to one embodiment, a weighted value may be assigned to light features associated with either a headlamp or taillight in order to prolong their classification by the classification module 30. As a result, the future response time at which the OFF signal is generated is increased such that the high beam 34 is remains ON longer and may be variously determined by the OEM. In embodiments where the high beam 34 is continuously variable between an ON and OFF state, the future response time of the OFF signal, as modified in step 165, may result in a prolonged start time at which to begin dimming of the high beam 34 and/or a prolonged length of time to dim off the high beam 34. By performing step 160 before step 165, the future response time may be variable based on the number and classification of the object(s) of interest, namely whether the object(s) of interest is an oncoming or preceding vehicle. However, it is contemplated that the response time of the OFF signal may be the same regardless of whether the object(s) of interest is an oncoming or preceding vehicle, if desired. Once the future response time of the OFF signal has been modified, the controller 14 saves it to memory 63 (FIG. 1) at step 135 and returns to step 100. In some embodiments, the future response time of the OFF signal, as modified at step 165, may overwrite a default response time or a previously saved future response time of the OFF signal such that the high beam 34 is turned OFF pursuant to the most recently saved future response time in a subsequent iteration of the step 110 under the conditions described above. Thus, it is to be understood that the future response time of the OFF signal, as modified and saved in steps 165 and 135, can be later implemented in specific instances where the signal 32 corresponds to an ON signal (e.g., resulting in the high beam 34 being in an ON state) and may be based on the number of objects of interest detected in the image data, a speed of the controlled vehicle, a relative distance and/or orientation between the controlled vehicle and the detected object(s) of interest, a geographical location of the controlled vehicle, or any combination thereof.

With respect to the present embodiment of the method 62, the various pathways described herein illustrate that multiple and distinct future OFF signals may be saved for a variety of specific driving scenarios. Each future OFF signal can be saved in a corresponding block of memory 63 and continuously updated through subsequent iterations of the method 62. In determining the future OFF signals, the controller 14 may advantageously classify between object(s) of interest and noninterest and may also consider information provided from one or more vehicle inputs. For example, the future response time of the OFF signals may be variable based on a classification type, a speed of the controlled vehicle, a relative positioning (e.g., distance and/or orientation) between the controlled vehicle and the classification type, an operating environment of the controlled vehicle, or a combination thereof. Accordingly, multiple iterations of the method 62 will eventually result in a response time of the OFF signals that is a close reflection of not only driver behavior, but also the environment in which the controlled vehicle is operating. Thus, over time, the frequency of overrides to the signal 32 may be substantially decreased or eliminated altogether, resulting in a more enjoyable driving experience for a driver of the controlled vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system comprising:
an image sensor configured to acquire one or more images of a scene external and forward of a controlled vehicle and to generate image data corresponding to the acquired images;
a controller communicatively connected to the image sensor and configured to:
receive and analyze the image data;
detect an object of interest in the image data, wherein the object of interest is at least one of an oncoming vehicle and a preceding vehicle;
generate an ON signal or an OFF signal based on the detection of the object of interest in the image data, or lack thereof, wherein a high beam control of the vehicle is turned ON based on the ON signal, and wherein the high beam control of the vehicle is turned OFF based on the OFF signal; and
modify a future response time at which the OFF signal is generated based on an external overriding of the ON signal or the OFF signal.

2. The imaging system of claim 1, wherein modification of the future response time is further based on detecting at least one object of interest in the image data subsequent to the external overriding of the ON signal or the OFF signal.

3. The imaging system of claim 1, wherein the controller shortens or increases the future response time based on the external overriding of the ON signal and at least one object of interest being detected in the image data.

4. The imaging system of claim 1, wherein modification of the future response time is further based on detection of at least one object of interest in the image data, a speed of the vehicle, a relative positioning between the vehicle and the at least one object of interest, a geographical location of the vehicle, or any combination thereof.

5. The imaging system of claim 1, wherein the controller is further configured to detect at least one object of noninterest in the image data, the at least one object of noninterest comprising non-vehicle light sources detected in the image data.

6. The imaging system of claim 5, wherein the controller is further configured to classify the at least one object of noninterest based on the detection of associated light features in the image data, and wherein a weighted value is assigned to light features associated with the at least one object of noninterest in order to hasten or prolong classification thereof, thereby decreasing or increasing the future response time at which the OFF signal is generated.

7. The imaging system of claim 1, wherein the future response time corresponds to at least one of a time at which to begin a dimming off of a high beam and a length of time to dim off the high beam.

8. A method of controlling exterior lights of a vehicle, comprising the steps of:
acquiring one or more images of a scene external and forward of a controlled vehicle and to generating image data corresponding to the acquired images;
analyzing the image data;
detecting an object of interest in the image data, wherein the object of interest is at least one of an oncoming vehicle and a preceding vehicle;
generating an ON signal or an OFF signal based on the detection of the object of interest in the image data, or lack thereof, wherein a high beam control of the vehicle is turned ON based on the ON signal, and wherein the high beam control of the vehicle is turned OFF based on the OFF signal; and
modifying a future response time at which the OFF signal is generated based on an external overriding of the ON signal or the OFF signal.

9. The method of claim 8, wherein the step of modifying the future response time is further based on detecting at least one object of interest in the image data subsequent to the external overriding of the ON signal or the OFF signal.

10. The method of claim 8, wherein the step of modifying the future response time further comprises shortening or increasing the future response time based on the external overriding of the ON signal and at least one object of interest being detected in the image data.

11. The method of claim 8, wherein the step of modifying the future response time is further based on detection of at least one object of interest in the image data, a speed of the vehicle, a relative positioning between the vehicle and the at least one object of interest, a geographical location of the vehicle, or any combination thereof.

12. The method of claim 8, further comprising the step of detecting at least one object of noninterest in the image data, the at least one object of noninterest comprising non-vehicle light sources detected in the image data.

13. The method of claim 12, further comprising the step of classifying the at least one object of noninterest based on the detection of associated light features in the image data and assigning a weighted value to light features associated with the at least one object of noninterest in order to hasten or prolong classification thereof, thereby decreasing or increasing the future response time at which the OFF signal is generated.

14. The method of claim 8, wherein the future response time corresponds to at least one of a time at which to begin a dimming off of a high beam and a length of time to dim off the high beam.

15. A non-transitory computer readable medium having stored thereon software instructions executed by a processor, the software instructions comprising the steps of:
acquiring one or more images of a scene external and forward of a controlled vehicle and to generating image data corresponding to the acquired images;
analyzing the image data;
detecting an object of interest in the image data, wherein the object of interest is at least one of an oncoming vehicle and a preceding vehicle;
generating an ON signal or an OFF signal based on the detection of the object of interest in the image data, or lack thereof, wherein a high beam control of the vehicle is turned ON based on the ON signal, and wherein the high beam control of the vehicle is turned OFF based on the OFF signal; and
modifying a future response time at which the OFF signal is generated based on an external overriding of the ON signal or the OFF signal.

16. The non-transitory computer readable medium of claim 15, wherein the step of modifying the future response time is further based on detecting at least one object of interest in the image data subsequent to the external overriding of the ON signal or the OFF signal.

17. The non-transitory computer readable medium of claim 15, wherein the step of modifying the future response time further comprises shortening or increasing the future response time based on the external overriding of the ON signal and at least one object of interest being detected in the image data.

18. The non-transitory computer readable medium of claim 15, wherein the step of modifying the future response time is further based on detection of at least one object of interest in the image data, a speed of the vehicle, a relative positioning between the vehicle and the at least one object of interest, a geographical location of the vehicle, or any combination thereof.

19. The non-transitory computer readable medium of claim 15, further comprising the step of detecting at least one object of noninterest in the image data, the at least one object of noninterest comprising non-vehicle light sources detected in the image data.

20. The non-transitory computer readable medium of claim 19, further comprising the step of classifying the at least one object of noninterest based on the detection of associated light features in the image data and assigning a weighted value to light features associated with the at least one object of noninterest in order to hasten or prolong classification thereof, thereby decreasing or increasing the future response time at which the OFF signal is generated.

* * * * *